United States Patent
Rueggen et al.

(10) Patent No.: US 7,618,265 B2
(45) Date of Patent: Nov. 17, 2009

(54) ELECTRICAL CONNECTION-AND JUNCTION BOX FOR A SOLAR CELL MODULE

(75) Inventors: Christian Rueggen, Bochum (DE); Axel Dickmann, Luedenacheid (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 0 days.

(21) Appl. No.: 12/342,763

(22) Filed: Dec. 23, 2008

(65) Prior Publication Data

US 2009/0209115 A1     Aug. 20, 2009

(30) Foreign Application Priority Data

Feb. 20, 2008     (DE) .................. 10 2008 010 026

(51) Int. Cl.
*H01R 12/00* (2006.01)
*H01R 13/62* (2006.01)

(52) U.S. Cl. ..................... 439/76.1; 439/259
(58) Field of Classification Search ............... 439/76.1, 439/258–261, 342, 535, 761, 835–836; 361/761
See application file for complete search history.

(56) References Cited

U.S. PATENT DOCUMENTS

| | | | | |
|---|---|---|---|---|
| 4,416,497 A * | 11/1983 | Brandsness et al. | ......... | 439/492 |
| 4,460,232 A * | 7/1984 | Sotolongo | ................... | 439/535 |
| 4,480,886 A * | 11/1984 | Bergamin | ................... | 439/325 |
| 4,767,340 A * | 8/1988 | Hohorst | ....................... | 439/729 |
| 6,267,607 B1 * | 7/2001 | Fitch et al. | ..................... | 439/92 |
| 7,014,497 B2 * | 3/2006 | Lange | .......................... | 439/441 |
| 7,094,071 B2 | 8/2006 | Hackemack et al. | | |
| 7,134,883 B2 * | 11/2006 | Werner et al. | ............... | 439/76.1 |
| 7,241,188 B2 * | 7/2007 | Lin et al. | ..................... | 439/838 |
| 7,291,036 B1 * | 11/2007 | Daily et al. | .................. | 439/487 |
| 7,444,743 B2 | 11/2008 | Feldmeier et al. | | |
| 2005/0085107 A1 | 4/2005 | Hackemack et al. | | |
| 2006/0283628 A1 | 12/2006 | Feldmeier et al. | | |

FOREIGN PATENT DOCUMENTS

| | | |
|---|---|---|
| DE | 10 2004 001 202 | 7/2004 |
| DE | 203 15 898 | 2/2005 |
| DE | 20 2004 000 418 | 6/2005 |
| DE | 10 2005 025 632 | 12/2006 |
| WO | 2008095668 | 8/2008 |

\* cited by examiner

*Primary Examiner*—Chandrika Prasad
(74) *Attorney, Agent, or Firm*—Brooks Kushman P.C.

(57) ABSTRACT

A solar cell module junction box includes a chamber and a clamping spring. The chamber has first and second walls each having bottom and top ends. The spring has first and second legs connected by a middle portion. The spring is inserted into the chamber such that the middle portion is adjacent to the bottom wall ends. The first leg is fixed to the first wall and the second leg is removably connectable to the second wall. The spring is movable between a closed position in which the second leg is disconnected from the second wall and moves toward the first leg and an opened position in which the second leg is connected to the second wall with the legs forming an opening. A conductor strip inserted between the legs is contacted by the second leg and held between the legs when the spring is in the closed position.

16 Claims, 2 Drawing Sheets

ELECTRICAL CONNECTION-AND JUNCTION BOX FOR A SOLAR CELL MODULE

CROSS-REFERENCE TO RELATED APPLICATIONS

This application claims foreign priority benefits under 35 U.S.C. §119(a)-(d) to DE 10 2008 010 026.9, filed Feb. 20, 2008, which is hereby incorporated by reference in its entirety.

BACKGROUND OF THE INVENTION

1. Field of the Invention

The present invention relates to a junction box for a solar cell module having solar cells connected by conductor strips in which the junction box includes a connector device having a clamping spring for connecting with one of the conductor strips.

2. Background Art

A junction box for a solar cell module having solar cells connected to one another by conductor strips is placed on the solar cell module. The junction box includes connector devices which are to connect the conductor strips with output lines. In particular, each connector device is to connect with a respective one of the conductor strips. In order to make connections between the connector devices and the conductor strips, the conductor strips are introduced into the junction box through the surface of the junction box placed on the solar cell module. The junction box has a removable top cover. As a result, the conductor strips can be connected by hand with the respective connector devices within the junction box.

Each connector device includes a conductor rail and a clamping spring. The conductor rails are for connecting the potentials. The clamping spring of each connector device is for connecting the conductor rail of the connector device with a respective one of the conductor strips. The clamping spring of each connector device is clipped onto the conductor rail of the connector device and the respective conductor strip in a connection region of the connector device in order to connect the conductor rail with the conductor strip.

The conductor strips are bent so that contact may be made from the top with the conductor rails through action of the clamping springs with the connection to the connector devices being thereby made. Each clamping spring in an initial state should thus have the smallest possible gap within the connection region of its connector device so that the pressure force exerted on the conductor strip by the clamping device is sufficiently large even for relatively thin conductor strips. A relatively high pressure force results in the initial state in which the clamping spring is already pre-tensioned as the clamping spring is mounted on the conductor rail and thereby widened. As a result, it is not possible to move the conductor strip between the clamping spring and the conductor rail without difficulty. In order to connect with the conductor strip, the clamping spring must be removed with the aid of a lever tool such as a screwdriver and must be held in an opened position so that the conductor strip can be inserted freely into the contact position. Such an operation is cumbersome and may be dangerous when mounting takes place under difficult conditions such as on a roof.

SUMMARY OF THE INVENTION

An object of the present invention includes a junction box for a solar cell module in which the junction box enables a significantly simpler and more convenient handling procedure for connecting with conductor strips of the solar cell module and thus improves workplace safety.

In carrying out the above object and other objects, the present invention provides a junction box for a solar cell module having solar cells connected by conductor strips. The junction box includes a chamber and a clamping spring. The chamber has first and second walls. Each wall of the chamber has a bottom end and a top end. The top ends of the walls of the chamber form an opening into the chamber. The clamping spring has first and second legs connected by a middle portion. The clamping spring is inserted into the chamber such that the middle portion of the clamping spring is adjacent to the bottom ends of the walls of the chamber. The first leg of the clamping spring is fixed to the first wall of the chamber and the second leg of the clamping spring is removably connectable to the second wall of the chamber. The clamping spring is movable between a closed position in which the second leg of the clamping spring is disconnected from the second wall of the chamber such that the second leg of the clamping spring moves toward the first leg of the clamping spring and an opened position in which the second leg of the clamping spring is connected to the second wall of the chamber such that the legs of the clamping spring are separated from one another and form an opening therebetween. A conductor strip inserted through the opening of the chamber into the chamber and between the opening of the legs of the clamping spring when the clamping spring is in the opened position is contacted by the second leg of the clamping spring and held between the legs of the clamping spring when the clamping spring is moved from the opened position to the closed position.

A junction box in accordance with embodiments of the present invention includes means for fixing the clamping springs in an opened position. In particular, the clamping springs and the chambers of the connector devices of the junction box are provided with the means for fixing the clamping springs in the opened position. The clamping springs can thereby be brought and fixed into their opened position prior to the junction box being mounted on a solar cell module. While the junction box is being mounted onto the solar cell module, the conductor strips can be inserted into the connector devices of the junction box without simultaneously requiring that the clamping springs be held in the opened position. When a conductor strip is brought into the desired condition within the chamber of a connector device, the clamping spring of the connector device can easily be released from the opened position to press the conductor strip against the conductor rail. This simplifies assembly under difficult conditions. Further, such a junction box can be delivered to a user with the clamping springs in the opened position such that the user can benefit from a simpler and faster mounting process for the conductor strips during the assembly step.

In an embodiment, the means for fixing a clamping spring of a connector device in the opened position include the following. One leg of the clamping spring has a perforated end provided with a window-like aperture. A latch is formed on a wall of the chamber of the connector device through which the perforated end of the clamping spring can be pulled so that the aperture hooks behind the latch with its rear inner edge to thereby fix the clamping spring in the opened position.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
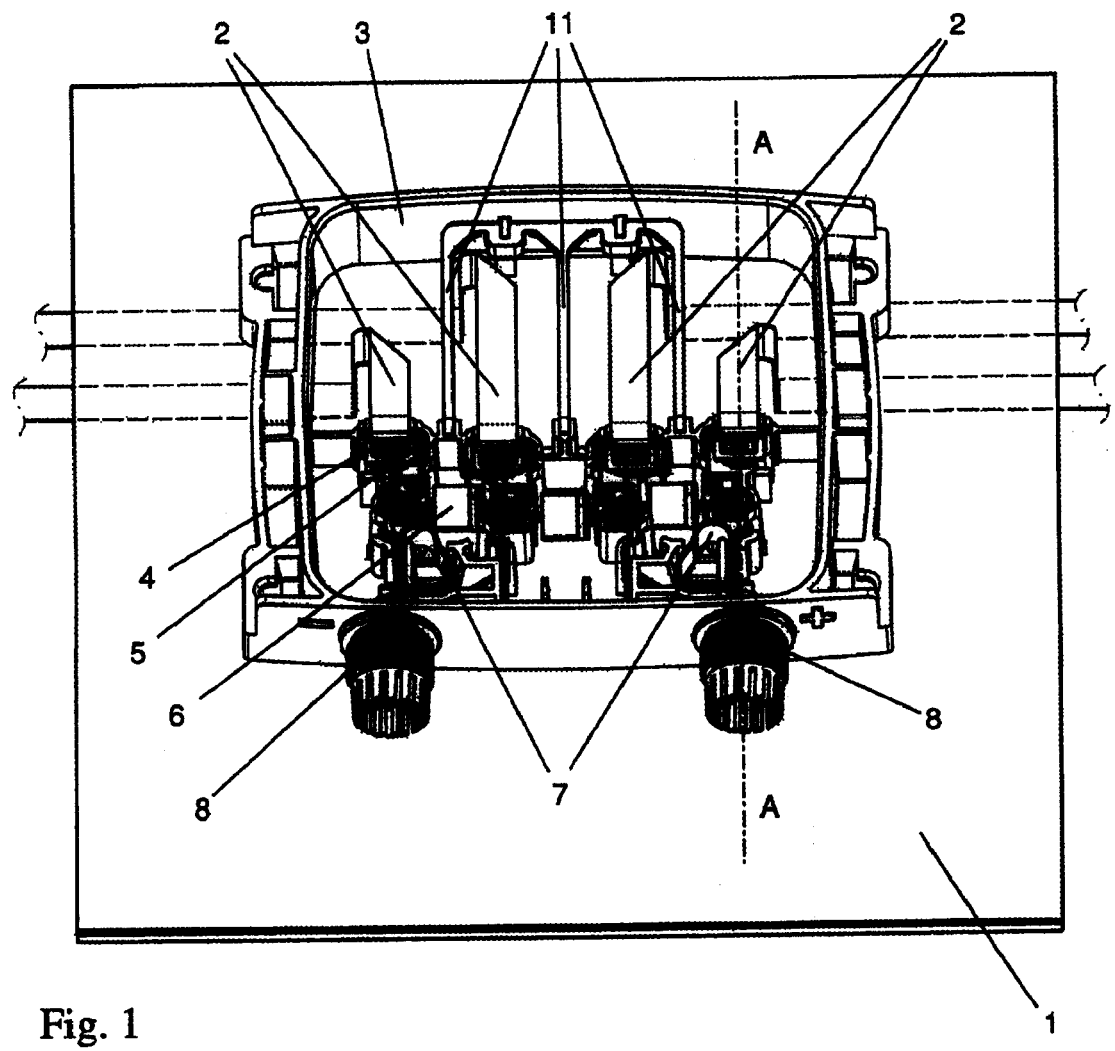
FIG. 1 illustrates a top oblique view of a junction box placed on a solar cell module in accordance with an embodiment of the present invention.

Referring now to FIG. 1, a top oblique view of an electrical connection—and junction box ("junction box") placed on a solar cell module 1 in accordance with an embodiment of the present invention is shown. Solar cell module 1 includes individual solar cells and conductor strips 2. Conductor strips 2 electrically connect the solar cells to one another. Conductor strips 2 are relatively thin and have a thickness of a few tenths of a millimeter and a width of a few millimeters. Conductor strips 2 extend out of solar cell module 1 for connection purposes.

The junction box includes a housing 3. Housing 3 is placed on solar cell module 1 with the bottom surface of housing 3 meeting solar cell module 1. Housing 3 includes a removable top cover. Housing 3 is shown in FIG. 1 with the top cover removed. Conductor strips 2 are introduced into housing 3 through apertures provided on the bottom surface of housing 3. Once introduced within housing 3, each conductor strip 2 is made available for manually making electrical contact with a respective electrical connector device in housing 3.

The two outer conductor strips 2 shown in FIG. 1 (i.e., the two conductor strips 2 which lie at the most left and right points inside the junction box) are connected directly with output lines leading to a connection with other junction boxes, an AC converter, or the like. The two inner conductor strips 2 shown in FIG. 1 (i.e., the two conductor strips 2 which lie between the two outer conductor strips 2) are connected to one another. The inner conductor strips 2 are connected with the outer conductor strips 2 through respective by-pass diodes 6.

Diodes 6 are connected anti-parallel to the solar cells of solar cell module 1. Diodes 6 insure that shaded solar cells are supplied with no larger portion of the total voltage of solar cell module 1 with the flow of current remaining the same. Solar cell module 1 thus only exhibits a reduced operating voltage, but does not drop out completely, as would be the case without diodes 6. In addition, no more power is converted in shaded solar cells such that damage to the shaded solar cells may be prevented.

The output lines may be insulated round conductors that are introduced into the connector apertures visibly marked with "+" and "−" on the front side of housing 3. The output lines are brought into electrical contact by spring clamps 7 which are arranged directly behind the connector apertures. The output lines can be secured on threads 8 surrounding the connector apertures by connecting sockets.

Housing 3 includes a plurality of partitions 11. Partitions 11 can either be installed as separate components in housing 3 or integrally formed with housing 3. Partitions 11 form separated chambers 9 in housing 3. Partitions 11 prevent conductor strips 2 from coming into contact with one another. Otherwise, conductor strips 2 may contact one another and cause a short circuit between them.

Each chamber 9 is part of a respective electrical connector device of the junction box. Each chamber 9 receives a respective one of the conductor strips 2 in order for the associated connector device to electrically connect with the respective conductor strip.

Each connector device includes a clamping spring 4 and a conductor rail 5. Clamping spring 4 and conductor rail 5 of a connector device are intended to make an electrically connection with a single conductor strip 2. Conductor rails 5 are made as flexible stamped components from a sheet metal material having relatively high electrical conductivity. Conductor rails 5 are used for connecting potentials inside chambers 9. Clamping springs 4 are intended to cause conductor rails 5 and conductor strips 2 to contact one another.

Figure 2:
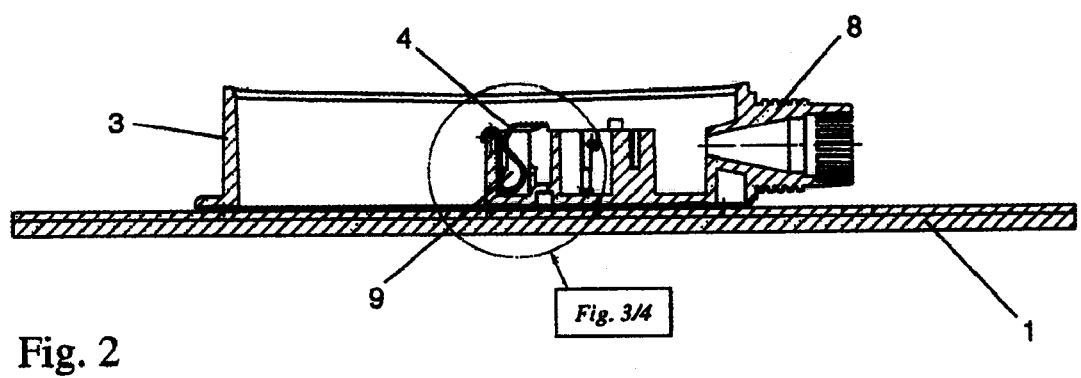
FIG. 2 illustrates a longitudinal section view of the junction box along the line A-A shown in FIG. 1.
Figure 3:
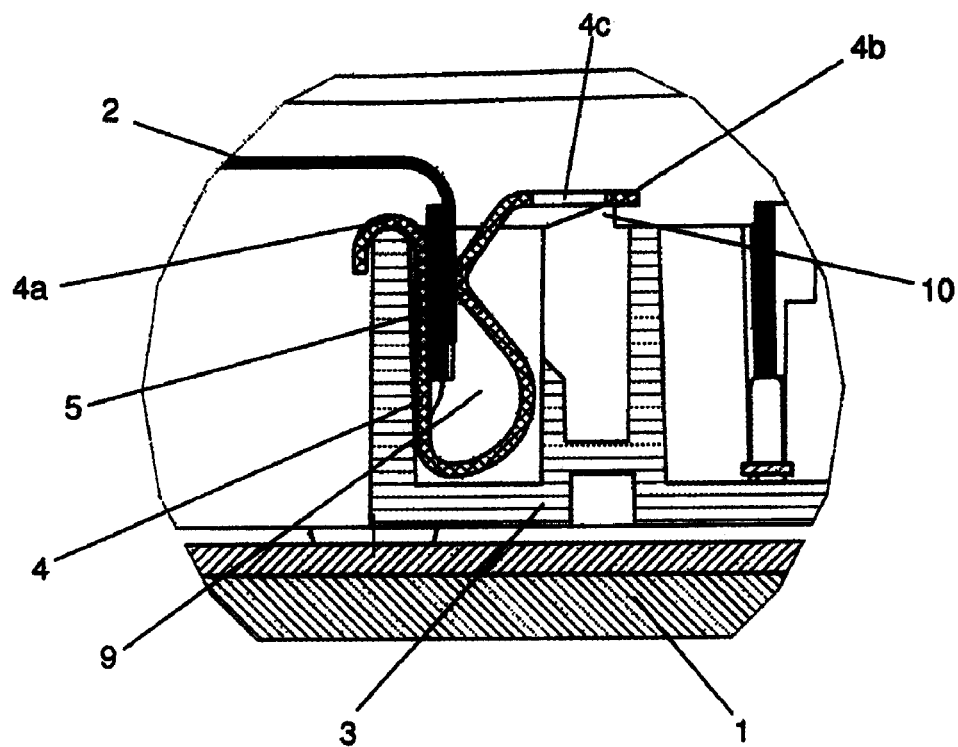
FIG. 3 illustrates an enlarged detail view of the circled section of FIG. 2 in which a clamping spring of a connector device of the junction box is in a closed position.
Figure 4:
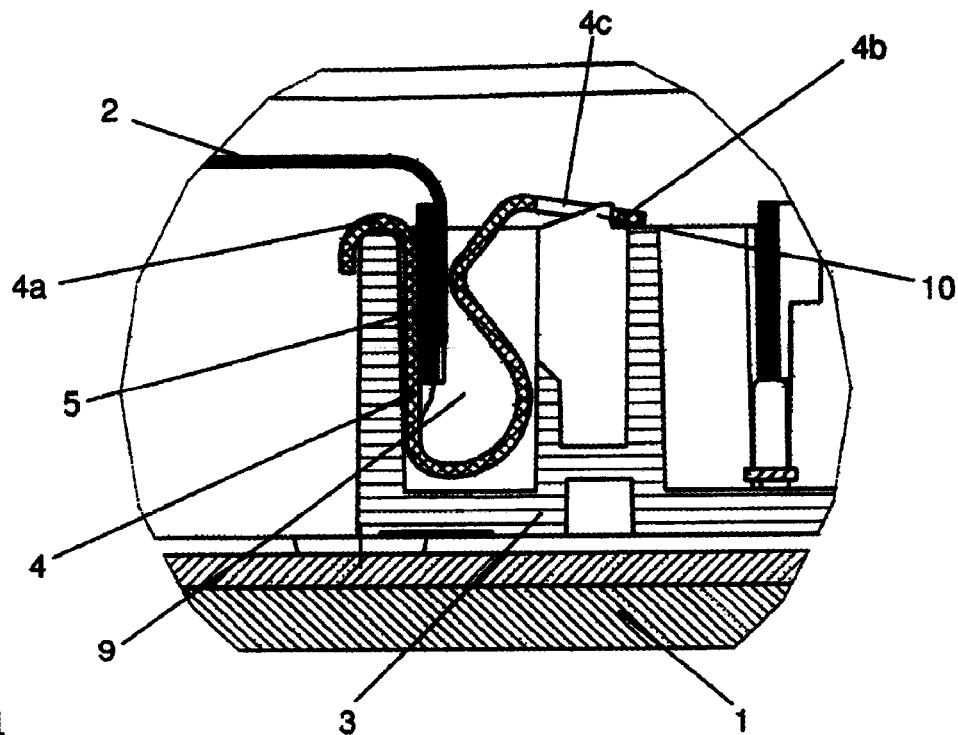
FIG. 4 illustrates an enlarged detail view of the circled section of FIG. 2 in which the clamping spring is in an opened position.

With reference to FIGS. 2, 3, and 4, chamber 9 of a connector device accommodates clamping spring 4 of the connector device placed on conductor rail 5 of the connector device. Clamping spring 4 has a shape in its longitudinal section that looks like an "Omega" opened at the top of chamber 9.

Referring now to FIGS. 3 and 4, clamping spring 4 includes first and second legs. Both legs of clamping spring 4 rest in the region of their closest approach to one another under pretension on conductor rail 5. In this manner, clamping spring 4 clamps conductor strip 2 rigidly between conductor rail 5 and a first one of the legs of clamping spring 4. The end of the second leg of clamping spring 4 includes a semicircular bend 4a. Bend 4a serves to fix clamping spring 4 to a first one of the walls of chamber 9. The end of the first leg of clamping spring 4 that lies on conductor strip 2 includes a bend that tapers off in a perforated end 4b. Perforated end 4b of the first leg of clamping spring 4 extends in the mounting position of clamping spring 4 parallel to the surface of solar cell module 1 and includes a window-like aperture 4c. A second one of the walls of chamber 9 includes a latch 10.

In FIG. 3, clamping spring 4 is in a closed position in which clamping spring 4 clamps conductor strip 2 rigidly between conductor rail 5 and the first leg of clamping spring 4. In the closed position, perforated end 4b of the second leg of clamping spring 4 is disengaged from latch 10 of the second wall of chamber 9.

In FIG. 4, clamping spring 4 is in an opened position in which perforated end 4b of the second leg of clamping spring 4 is pulled over latch 10 such that aperture 4c hooks behind latch 10 with its rear inner edge. Perforated end 4b of the second leg of clamping spring 4 can be pulled over latch 10 either before the junction box is delivered to a user, or by the user prior to the junction box mounting procedure, for example, with the aid of a lever tool like a screwdriver. Clamping spring 4 is thereby fixed in its opened position so that conductor strip 2 can be readily introduced into chamber 9 between conductor rail 5 and the second leg of clamping spring 4. To transfer into the closed position of clamping spring 4, clamping spring 4 can be easily released from the hooked closed position (shown in FIG. 4) to then rigidly clamp conductor strip 2 against conductor rail 5 (shown in FIG. 3).

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A junction box for a solar cell module having solar cells connected by conductor strips, the junction box comprising:
   a chamber having first and second walls, each wall of the chamber having a bottom end and a top end, the top ends of the walls of the chamber forming an opening into the chamber; and
   a clamping spring having first and second legs connected by a middle portion, the clamping spring inserted into the chamber such that the middle portion of the clamping spring is adjacent to the bottom ends of the walls of the chamber, the first leg of the clamping spring is fixed to the first wall of the chamber and the second leg of the clamping spring is removably connectable to the second wall of the chamber;
   wherein the clamping spring is movable between a closed position in which the second leg of the clamping spring is disconnected from the second wall of the chamber such that the second leg of the clamping spring moves toward the first leg of the clamping spring and an opened position in which the second leg of the clamping spring is connected to the second wall of the chamber such that the legs of the clamping spring are separated from one another and form an opening therebetween;
   wherein a conductor strip inserted through the opening of the chamber into the chamber and between the opening of the legs of the clamping spring when the clamping spring is in the opened position is contacted by the second leg of the clamping spring and held between the legs of the clamping spring when the clamping spring is moved from the opened position to the closed position.

2. The junction box of claim 1 wherein:
   the second leg of the clamping spring includes a perforated end having an aperture and the top end of the second wall of the chamber includes a latch;
   wherein the perforated end of the second leg of the clamping spring can be pulled over the latch such that the aperture of the perforated end of the second leg of the clamping spring hooks onto the latch to thereby connect the second leg of the clamping spring to the second wall of the chamber.

3. The junction box of claim 1 further comprising:
   a conductor rail inserted between the legs of the clamping spring;
   wherein the conductor rail is held between the first leg of the clamping spring and the conductor strip when the conductor strip is held between the legs of the clamping spring while the clamping spring is in the closed position.

4. The junction box of claim 3 wherein:
   the conductor rail is formed from a sheet metal material having electrical conductivity.

5. The junction box of claim 1 wherein:
   the chamber has a pocket-shaped recess form.

6. The junction box of claim 1 further comprising:
   a housing having partitions for forming the chamber.

7. The junction box of claim 6 wherein:
   the partitions are inserted as a separate unit into the housing.

8. The junction box of claim 6 wherein:
   the partitions are formed integrally with the housing.

9. A junction box for a solar cell module having solar cells connected by conductor strips, the junction box comprising:
   a plurality of chambers, each chamber having first and second walls, each wall having a bottom end and a top end, the top ends of the walls of each chamber forming an opening into the chamber; and
   a plurality of clamping springs, each clamping spring having first and second legs connected by a middle portion, each clamping spring inserted into a respective one of the chambers such that the middle portion of the clamping spring is adjacent to the bottom ends of the walls of the respective chamber, the first leg of the clamping spring is fixed to the first wall of the respective chamber, and the second leg of the clamping spring is removably connectable to the second wall of the respective chamber;
   wherein each clamping spring is movable between a closed position in which the second leg of the clamping spring is disconnected from the second wall of the respective chamber such that the second leg of the clamping spring moves toward the first leg of the clamping spring and an opened position in which the second leg of the clamping spring is connected to the second wall of the respective chamber such that the legs of the clamping spring are separated from one another and form an opening therebetween;
   wherein a conductor strip inserted through the opening of one of the chambers into the chamber and between the opening of the legs of the clamping spring inserted in the chamber when the clamping spring is in the opened position is contacted by the second leg of the clamping spring and held between the legs of the clamping spring when the clamping spring is moved from the opened position to the closed position.

10. The junction box of claim 9 wherein:
    the second leg of each clamping spring includes a perforated end having an aperture and the top end of the second wall of each chamber includes a latch;
    wherein the perforated end of the second leg of the clamping spring inserted into one of the chambers can be pulled over the latch of the chamber such that the aperture of the perforated end of the second leg of the clamping spring hooks onto the latch to thereby connect the second leg of the clamping spring to the second wall of the chamber.

11. The junction box of claim 9 further comprising:
    a plurality of conductor rails, wherein each conductor rail is respectively inserted between the legs of one of the clamping springs;
    wherein each conductor rail is held between the first leg of the clamping spring and a conductor strip when the conductor strip is held between the legs of the clamping spring while the clamping spring is in the closed position.

12. The junction box of claim 11 wherein:
    the conductor rails are formed from a sheet metal material having electrical conductivity.

13. The junction box of claim 9 wherein:
    each chamber has a pocket-shaped recess form.

14. The junction box of claim 9 further comprising:
    a housing having partitions for forming the chambers.

15. The junction box of claim 14 wherein:
    the partitions are inserted as a separate unit into the housing.

16. The junction box of claim 14 wherein:
    the partitions are formed integrally with the housing.

* * * * *